United States Patent
Balogh et al.

(10) Patent No.: US 10,818,182 B2
(45) Date of Patent: Oct. 27, 2020

(54) SYSTEM AND METHOD FOR CONTROLLING UTILITY VEHICLES

(71) Applicant: KNORR-BREMSE SYSTEME FUER NUTZFAHRZEUGE GMBH, Munich (DE)

(72) Inventors: Levente Balogh, Szigetszentmiklos (HU); Huba Nemeth, Budapest (HU); Csaba Horvath, Biatorbagy (HU); Viktor Tihanyi, Budapest (HU); Tamas Rapp, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/329,936

(22) PCT Filed: Aug. 14, 2017

(86) PCT No.: PCT/EP2017/070606
§ 371 (c)(1),
(2) Date: Mar. 1, 2019

(87) PCT Pub. No.: WO2018/046248
PCT Pub. Date: Mar. 15, 2018

(65) Prior Publication Data
US 2019/0189012 A1    Jun. 20, 2019

(30) Foreign Application Priority Data
Sep. 8, 2016   (DE) .................. 10 2016 116 855

(51) Int. Cl.
*G05D 1/02* (2020.01)
*G08G 1/16* (2006.01)

(52) U.S. Cl.
CPC .......... *G08G 1/163* (2013.01); *G05D 1/0274* (2013.01); *G08G 1/165* (2013.01); *G05D 2201/0216* (2013.01)

(58) Field of Classification Search
CPC ......... G05D 2201/0216; G05D 1/0274; G08G 1/163; G08G 1/165
(Continued)

(56) References Cited

U.S. PATENT DOCUMENTS

| | | | |
|---|---|---|---|
| 2010/0052882 A1* | 3/2010 | Sverrisson | B60R 25/10 340/426.11 |
| 2014/0236477 A1* | 8/2014 | Chen | G07C 5/008 701/450 |

(Continued)

FOREIGN PATENT DOCUMENTS

| | | | | |
|---|---|---|---|---|
| DE | 10322765 A1 | 1/2005 | | |
| DE | 102004047214 A1 * | 3/2006 | ........... | G05D 1/0246 |

(Continued)

OTHER PUBLICATIONS

International Search Report dated Nov. 17, 2017, of the corresponding International Application PCT/EP2017/070606 filed Aug. 14, 2017.

*Primary Examiner* — Behrang Badii
*Assistant Examiner* — Hossam M Abd El Latif
(74) *Attorney, Agent, or Firm* — Norton Rose Fulbright US LLP; Gerard Messina

(57) ABSTRACT

A system for controlling a commercial vehicle in a restricted area, including: an information acquisition module to acquire information from a database about the restricted area, wherein the commercial vehicle includes a sensor unit to detect objects in surroundings of the commercial vehicle, and wherein the acquired information includes cartographic data for objects in the restricted area; a detection module to detect at least one object in the surroundings of the vehicle (Continued)

using the sensor unit of the commercial vehicle; an identification module to identify the at least one detected object in the cartographic data; and a movement module to allow autonomous movement of the commercial vehicle in the restricted area based on the identified objects. Also described are a related commercial vehicle, a method and a computer readable medium.

10 Claims, 4 Drawing Sheets

(58) Field of Classification Search
USPC .......................................................... 701/301
See application file for complete search history.

(56) References Cited

U.S. PATENT DOCUMENTS

| | | | | |
|---|---|---|---|---|
| 2015/0019042 | A1* | 1/2015 | Poechmueller | B60W 50/14 |
| | | | | 701/1 |
| 2017/0364072 | A1* | 12/2017 | Yako | B60W 50/00 |
| 2018/0144639 | A1* | 5/2018 | Kumar | G05D 1/0088 |

FOREIGN PATENT DOCUMENTS

| | | |
|---|---|---|
| DE | 102004047214 A1 | 3/2006 |
| DE | 102010033729 A1 | 2/2012 |
| DE | 102011112404 A1 | 3/2013 |
| DE | 102014221777 A1 | 4/2016 |
| DE | 102015001631 A1 | 8/2016 |
| DE | 102015002144 A1 | 8/2016 |

* cited by examiner

SYSTEM AND METHOD FOR CONTROLLING UTILITY VEHICLES

FIELD OF THE INVENTION

The present invention relates to a system and a method for controlling commercial vehicles in a restricted area and in particular to the use of static objects from a map database for surroundings detection.

BACKGROUND INFORMATION

For the autonomous driving of commercial vehicles, it is increasingly important to form suitable environment detection so as thereby to be able to make correct control decisions for the further movement of the commercial vehicle. The environment detection can be achieved for example by a sensor or a combination of different sensors.

However, ambient sensors are susceptible to errors and external interference (e.g. on account of poor weather conditions and the like) that adversely affect the accuracy of the sensors. In order to improve the reliability and accuracy of the object detection, results from different sensors or different algorithms can admittedly be combined with one another so as to obtain confirmation of a detected object. Such systems are complex, however, and, if no further sensors are available, are not always implementable.

There is thus a need for systems in order to improve the orientation of the commercial vehicles in an autonomous mode of operation.

SUMMARY OF THE INVENTION

At least some of the aforementioned problems may be solved by a system for controlling a commercial vehicle as described herein, an associated method as described herein and a commercial vehicle as described herein. The further descriptions herein define further advantageous embodiments.

The present invention relates to a system for controlling commercial vehicles in a restricted area. The commercial vehicle comprises a sensor unit configured to detect objects in surroundings of the commercial vehicle. The system comprises an information acquisition module, a detection module, an identification module and a movement module. The information acquisition module is configured to acquire information from a database about the restricted area, wherein the acquired information comprises cartographic data for objects in the restricted area. The detection module is configured to detect at least one object in the surroundings of the commercial vehicle using the sensor unit of the commercial vehicle. The identification module is configured to identify the at least one detected object in the cartographic data. The movement module is configured to allow autonomous movement of the commercial vehicle in the restricted area based on the identified objects.

Objects can be static objects and/or dynamic objects, static objects being for example roads, buildings, junctions and reference points and dynamic objects being for example other vehicles whose position is known, for example, and which are thus suitable for position determination. The detection of the at least one object can comprise in particular capture of position data and/or orientation data of the commercial vehicle relative to the at least one object.

The identification module can perform mapping, in particular for the identification of objects, specifically the at least one detected object can be mapped onto the cartographic data obtained by the information acquisition module. This mapping can be performed for example such that the cartographic data contain a road area with different buildings that are compared with the objects detected by the detection module in the surroundings of the commercial vehicle. Therefore, explicit identification of the position within the map material acquired from the database is possible. Since the objects in the map material have a known position, the position of the commercial vehicle can therefore be determined or at least the accuracy thereof can be improved.

Optionally, the movement module can thus be configured to ascertain a position of the commercial vehicle during the autonomous movement based on the cartographic data from the database and based on the at least one detected object.

Optionally, the detection module can have a sensor module that comprises at least one of the following components: a radar, a laser scanner, a wireless transmission device, a mobile radio module, a differential or global positioning system (GPS), a camera and further localization systems. The identification module can then further be configured to ascertain a relative position based on data from the sensor unit (in the vehicle) or the sensor module (in the system).

Optionally, the sensor unit of the vehicle likewise has at least one of the following components: a differential or global positioning system, a camera, a radar, a laser scanner, a wireless communication interface or a mobile radio module.

Optionally, the identification module can be configured to take sensor data from the sensor unit or the sensor module as a basis for detecting a reference point in surroundings of the commercial vehicle and to ascertain a position of the commercial vehicle relative to the reference point. The reference point can be for example a marking on the roadway or on a building or a wall that has a known position that can be used for position finding.

The commercial vehicle can have at least one dynamic vehicle sensor configured to ascertain a speed and/or change of direction of the commercial vehicle. The movement module can then be configured to take sensor data from the at least one dynamic vehicle sensor as a basis for determining at least one change of position relative to the previously detected position in order to allow a path of movement to be tracked.

Optionally, the information acquisition module is configured to store the cartographic data in the commercial vehicle or to read them from a memory of the commercial vehicle.

The commercial vehicle can additionally have a radio unit and the information acquisition module can be configured to wirelessly contact the database via the radio unit so as to acquire (download) information.

The restricted area can have an entrance, an exit and a predetermined destination. Access to the restricted area can be restricted for people. The movement module can optionally be configured to autonomously move the commercial vehicle from the entrance to the predetermined destination and to autonomously move it from the predetermined destination to the exit (in particular in a driverless manner).

The present invention also relates to a commercial vehicle having a system, as has been described above, and vehicle actuators, wherein the commercial vehicle can be moved by actuating the vehicle actuators. The movement module of the system can carry out the actuation. It goes without saying that the system can also be implemented in other vehicles (e.g. passenger vehicles) and the invention is not meant to be restricted to commercial vehicles.

The present invention also relates to a method for controlling commercial vehicles in the restricted area. The method comprises the following steps: acquiring information about the restricted area from a database, wherein the acquired information comprises cartographic data for objects in the restricted area; detecting at least one object in the surroundings of the commercial vehicle using the sensor unit of the commercial vehicle; identifying the at least one detected object in the cartographic data; and autonomously moving the commercial vehicle in the restricted area based on the identified objects.

This method can likewise be implemented or stored in the form of instructions in software or on a computer program product, wherein stored instructions are able to carry out the steps according to the method when the method runs on a processor (e.g. one of the vehicle control units). Thus, the present invention likewise relates to a computer program product with software code (software instructions) stored thereon that is configured to carry out one of the methods described above when the software code is executed by a processor unit. The processing unit can be any form of computer or control unit that has an appropriate microprocessor that can execute a software code.

Exemplary embodiments for the advantage that improved positon determination is made possible, which is important in particular for safe autonomous movement. This improvement is achieved by the static objects that are downloaded from the database with the cartographic data (map material) and are used to recognize the objects using the ambient sensors. This is accomplished in a simple manner by virtue of the objects from the surroundings being compared against the cartographic data (objects are mapped onto one another).

Special advantages are afforded by exemplary embodiments in particular in specific, nonstandardized or restricted areas where the positions of static objects in general are known and can be used to further improve the position finding in surroundings of the vehicle.

The exemplary embodiments of the present invention will be better understood from the detailed description that follows and the accompanying drawings of the different exemplary embodiments, which should not be understood as limiting the disclosure to the specific embodiments, however, but rather merely serve for explanation and comprehension.

DETAILED DESCRIPTION

Figure 1:
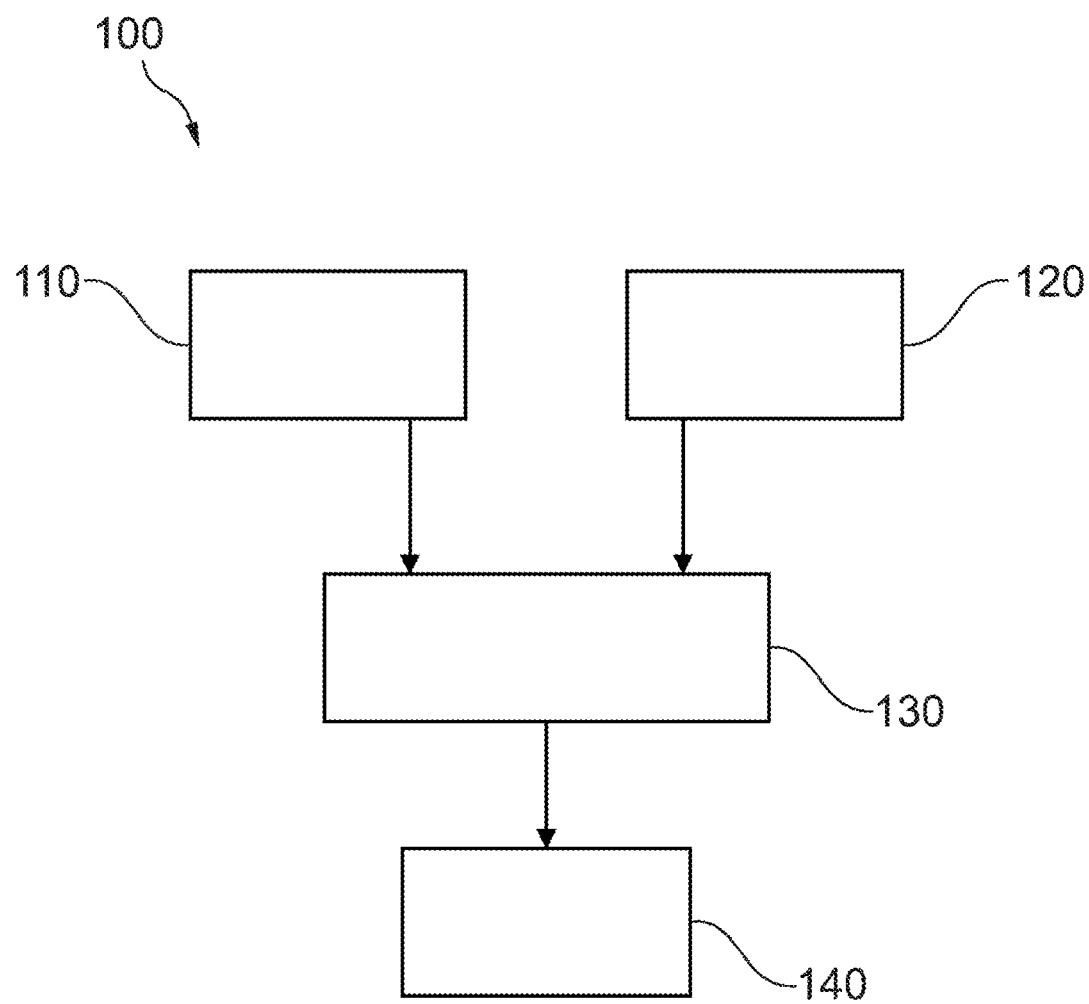
FIG. 1 shows an exemplary embodiment of a system for controlling a commercial vehicle in a restricted area.

FIG. 1 shows an exemplary embodiment of a system 100 suitable for controlling commercial vehicles in a restricted area, wherein the commercial vehicle has a sensor unit for detecting objects in surroundings of the commercial vehicle. The system 100 comprises an information acquisition module 110, a detection module 120, an identification module 130 and a movement module 140. The information acquisition module 110 is configured to acquire information about the restricted area from an (external) database, wherein the acquired information has cartographic data for objects in a restricted area and can be obtained by downloading, for example. The detection module 120 is configured to detect at least one object in the surroundings of the vehicle using the sensor unit of the commercial vehicle. The identification module 130 is configured to identify the at least one detected object in the cartographic data. The movement module 140 is configured to allow autonomous movement of the commercial vehicle in the restricted area based on the identified objects.

Thus, the system is able to safely move the commercial vehicle within the area and to autonomously perform changes of positon. In particular, it is possible for one or more destinations within the area to be covered in a particular order. A particular action can be performed on the vehicle at the predetermined destination, such as for example loading or unloading, but also cleaning or maintenance of the commercial vehicle or filling up or charging batteries (i.e. where an energy state of charge is changed) or any combination of these.

The system 100 can be implemented entirely or partially by software, which is installed in a control unit of the commercial vehicle in order to perform the described functions. The system 100 can alternatively be implemented partially and entirely in a control unit outside the commercial vehicle.

Figure 2:
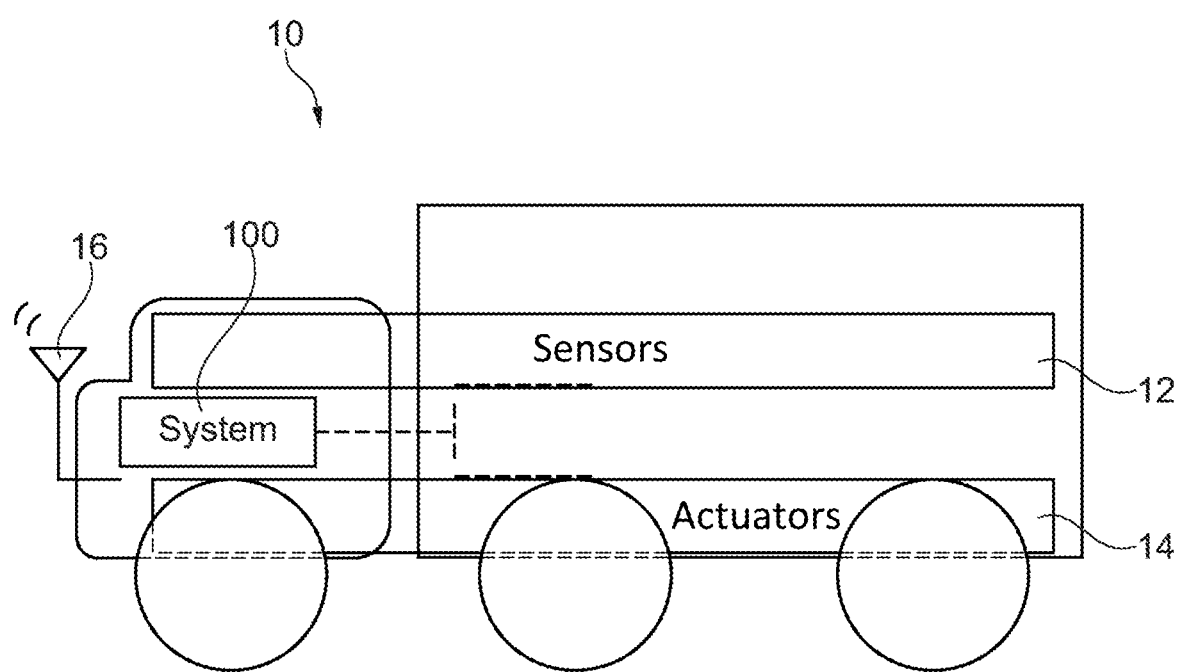
FIG. 2 shows a vehicle as can be used in exemplary embodiments of the invention.

FIG. 2 shows an exemplary embodiment of a vehicle 10, in particular a commercial vehicle, that can be used in order to be operated autonomously within the restricted area. The commercial vehicle 10 comprises the system 100, which for example can be installed within a controller of the vehicle 10 or accommodated in the vehicle 10 as separate hardware.

The commercial vehicle 10 further comprises a sensor unit 12 configured to detect an environment of the vehicle 10 (for example in order to ascertain distances from other objects or in order to detect changes of movement or changes of speed). The commercial vehicle 10 further comprises a multiplicity of vehicle actuators 14, which for example are configured to steer the vehicle 10 along a path. These include in particular steering and brake actuators that steer or slow down the vehicle 10. Similarly, they include vehicles actuators 14 that can cause the vehicle 10 to accelerate. Optionally, the vehicle 10 comprises a dedicated communication module 16 that can set up a radio connection to an external network.

The system 100 can for example be configured to use the communication module 16 of the vehicle 10 in order to obtain data (e.g. the cartographic data) from the external network or to send said data thereto. Additionally, the communication module 16 can be used in order to connect the commercial vehicle 10 to a management system of the restricted area in order to obtain therefrom data for a path 200 that is to be traveled.

The commercial vehicle 10 can comprise for example a bus, a truck, a traction engine for a trailer or a combination of multiple vehicle parts (e.g. including a trailer).

Figure 3:
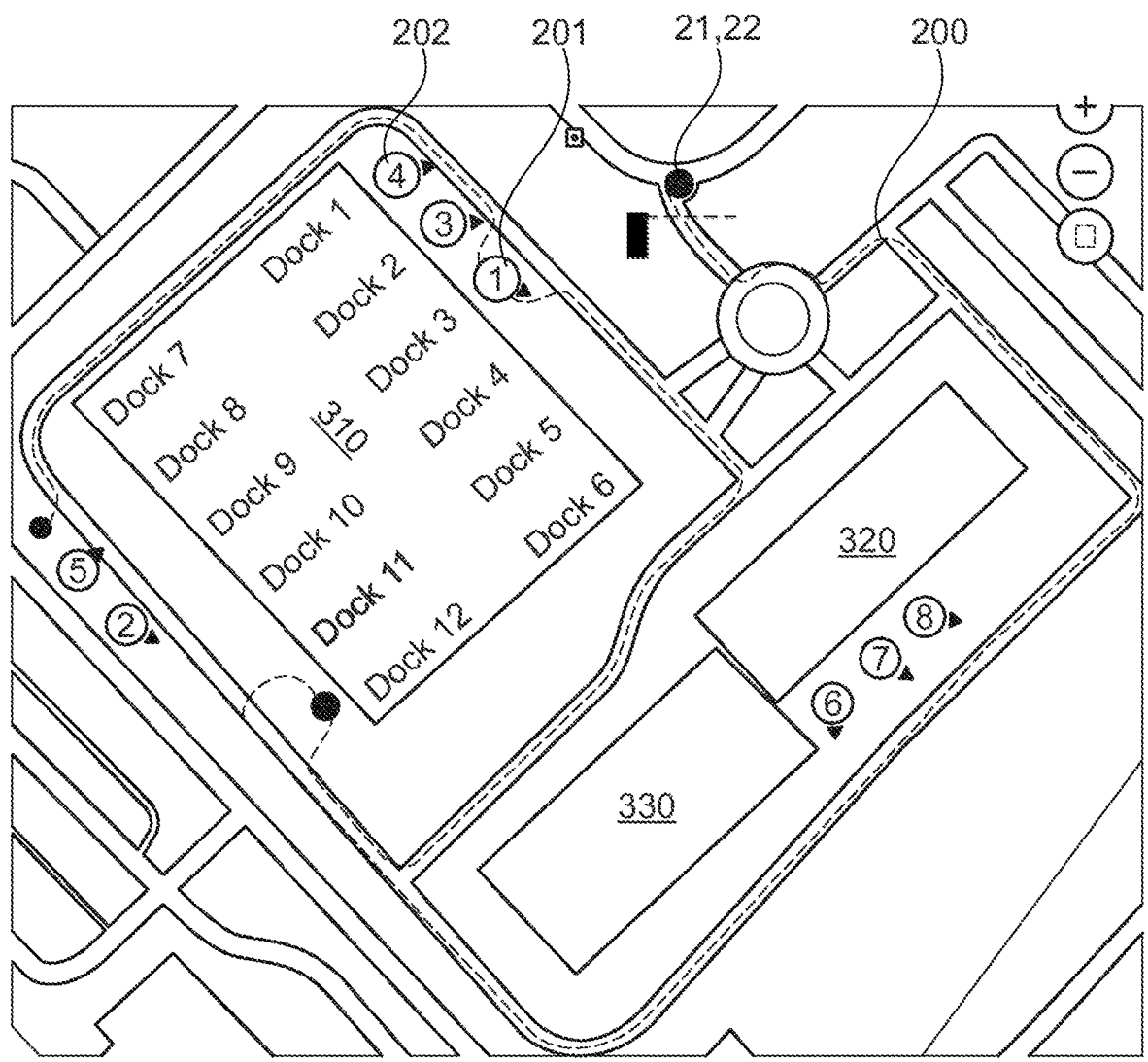
FIG. 3 shows cartographic data for an exemplary restricted area.

FIG. 3 shows a map of a specific, nonstandardized or restricted area by way of example. The map can also be augmented with further information about the static objects and the position thereof (not shown).

The area shown comprises a multiplicity of static objects that can be used for improving vehicle localization. By way of example, the static objects that the area comprises are: an entrance 21/exit 22, two predetermined destinations 201, 202 and three buildings 310, 320, 330. A path 200 can be calculated for the commercial vehicle, for example in order to operate the vehicle autonomously in the area.

There can be provision for an access control at the entrance 21, so that there is the assurance that only commercial vehicles 10 or vehicles that meet the requirements of the restricted area are moving about in the restricted area. The commercial vehicle 10 can be for example a vehicle as shown in FIG. 2. As part of the path 200, a path specification can be transmitted to the vehicle 10, which reveals the waypoints to be covered (at what positions to turn and e.g. how). The path 200 leads past different buildings 310, 320, 330, for example, which can be detected by the sensor unit 12 of the commercial vehicle 10 using an ambient sensor system. The path 200 then leads to the two predetermined destinations 201, 202 by way of example, which are for example docking stations at a warehouse 310 where the commercial vehicle 10 docks, for example in order to perform loading and unloading activities.

The movement module 140 can additionally receive planning data in order to autonomously navigate the vehicle 10 to the different destinations 201, 202 where the planned actions are to be performed on the commercial vehicle. The movement module 140 can then autonomously navigate the vehicle 10 to the exit 22. The exit 22 can be the same point as the entrance 21, where the driver of the vehicle 10 can take back control over the vehicle 10 and, driving manually, drives the vehicle 10 out of the restricted area.

The system 100 can likewise comprise interfaces to the vehicle sensor unit 12 and to the vehicle actuators 14 in order to detect a state of the vehicle 10 and of the surroundings (e.g. detection of the buildings 320, 330, 310 or a relative orientation in relation thereto) and in order to take this is a basis for performing control of the vehicle state, specifically without this requiring any assistance from the driver. These interfaces can permit wireless communication, for example.

The restricted area shown is merely one example. The system 100 is employable in particular for areas where a high level of accuracy for the navigation of the vehicle 10 is required within a short time and where damage frequently occurs during manual operation of the commercial vehicles 10. Specifically in such areas, the system 100 ensures safe operation of the commercial vehicle 10. By way of example, these and other transport vehicles (a ferry, a railway, an aircraft, a road train, etc.) on which the commercial vehicle 10 is meant to be parked with a high level of precession.

Exemplary embodiments of the present invention therefore combine the autonomous mode of operation of a vehicle in specific, nonstandardized or restricted areas, one of which is shown by way of example in FIG. 3, with a localization function of the vehicle 10. As stated, the localization is effected using the sensor unit 12. By using commination arrangement 16 between the vehicle 10 and an infrastructure of the area, the cartographic data can be downloaded and necessary information can be obtained.

In particular, it is possible to ascertain the present vehicle positon relative to a reference point (or an object) so as to determine a relative position of the vehicle. Advantageously, this position determination can be effected dynamically (on the basis of time), so that tracking of a changing position of the vehicle likewise becomes possible. To this end, it is possible to use for example dynamic vehicle sensors such as for example a tachometer, an angular velocity meter, a steering angle sensor or similar sensors, for example in order to ascertain the movement away from the reference point.

The database with the map material of the area (see FIG. 3) can already be on the vehicle 10 or can be downloaded from an infrastructure of the restricted area. Apart from journey or lane information material, the database can likewise contain a description of the static objects, such as for example the buildings 310, 320, 330, bridges, overpasses or other obstacles, and provide it to the vehicle. By using the vehicle positon and the map database with the static object information, it is therefore possible to involve these objects in the surroundings of the vehicle 10 in an environment detection process, which, as stated, makes the reliability and accuracy of the vehicle location within the area possible.

Knowledge of the static objects in the restricted area is important in particular if other localization systems, such as for example a GPS system, are not available or an applicable signal is not receivable. It is thus possible for the static objects to be used in order to determine the position of the vehicle in the restricted area more accurately independently of other positioning systems. The position, the movement or the direction of movement of the vehicle can thus be estimated more accurately—even if the signals usually used are not available for this (for example in the event of a loss of signal by the GPS appliance).

Figure 4:
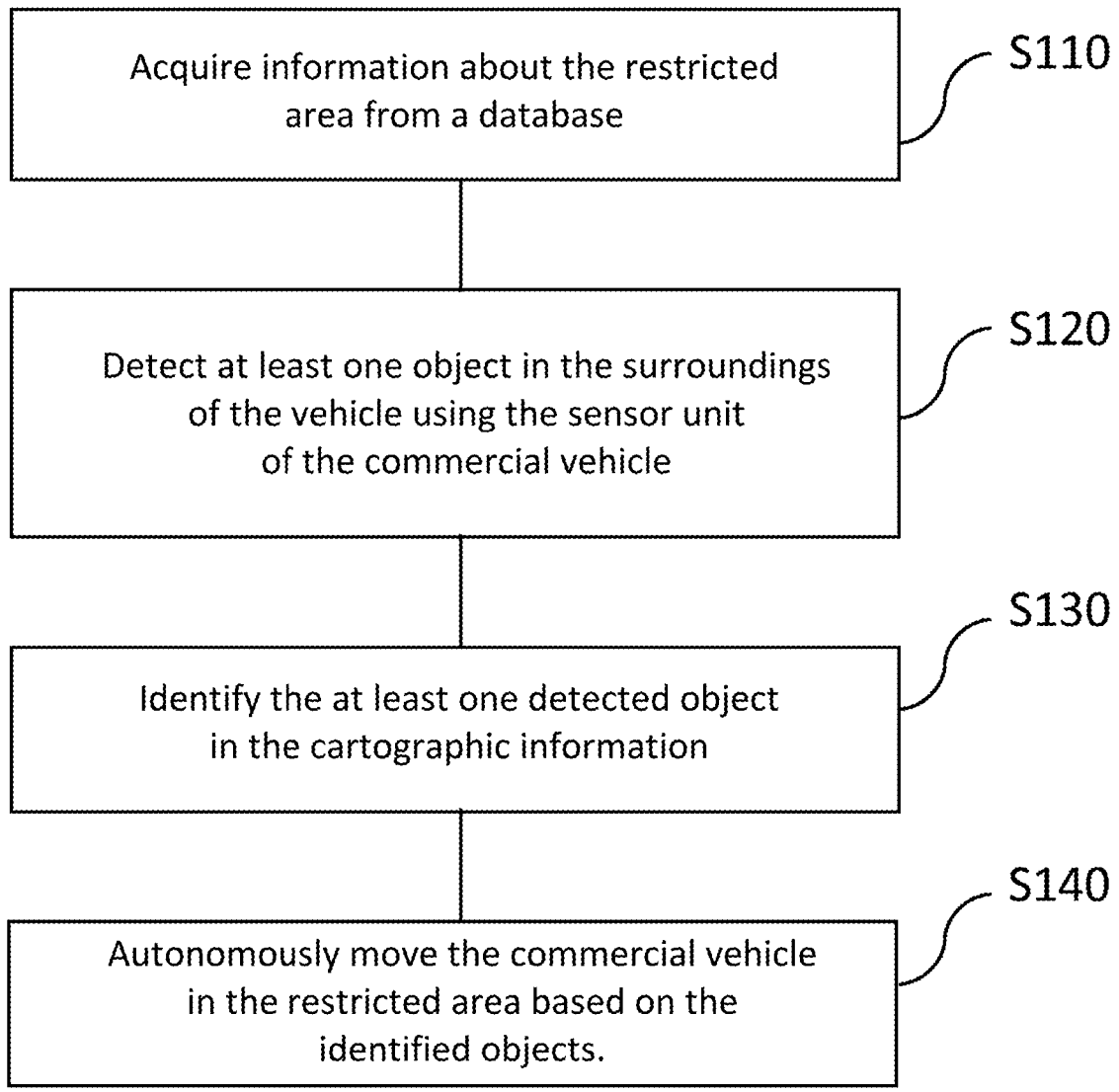
FIG. 4 shows a flowchart for a method for controlling a commercial vehicle.

FIG. 4 shows a flowchart for a method for controlling the commercial vehicle in a restricted area. The method comprises the steps of:

acquiring S110 information about the restricted area from a database, wherein the acquired information comprises cartographic data for objects in the restricted area;

detecting S120 at least one object in the surroundings of the vehicle 10 using the sensor unit 12 of the commercial vehicle; and identifying S130 the at least one detected object in the cartographic information; and autonomously moving S140 the commercial vehicle 10 in the restricted area based on the identified objects.

The method or at least part of it can likewise be computer-implemented, i.e. it can be implemented by instructions that are stored on a storage medium and are capable of carrying out the steps of the method when it runs on a processor. The instructions typically comprise one or more instructions that can be stored in different ways on different media in or peripherally to a control unit (having a processor) and that, when read and executed by the control unit, prompts the control unit to perform functions, functionalities and operations that are necessary for carrying out a method according to the present invention.

The features of the invention that are disclosed in the description, the claims and the figures can be essential to the implementation of the invention either individually or in any combination.

THE LIST OF REFERENCE SIGNS IS AS FOLLOWS

10 Commercial vehicle
12 Vehicle sensor unit
14 Vehicle actuators
16 Radio module
21, 22 Entrance/exit
110 Information acquisition module
120 Detection module
130 Identification module
140 Movement module
310,320,330 Buildings
201, 202, . . . Predetermined destinations

The invention claimed is:

1. A system for controlling a commercial vehicle in a restricted area, comprising:

an information acquisition module to acquire information from a database about the restricted area, wherein the commercial vehicle includes a sensor unit to detect objects in surroundings of the commercial vehicle, and wherein the acquired information includes cartographic data for objects in the restricted area;
a detection module to detect at least one object in the surroundings of the vehicle using the sensor unit of the commercial vehicle;
an identification module to identify the at least one detected object in the cartographic data;
and a movement module to allow autonomous movement of the commercial vehicle in the restricted area based on the identified objects,
wherein the movement module is configured to ascertain a position of the commercial vehicle during the autonomous movement based on the cartographic data from the database and based on the at least one detected object, and wherein the restricted area has an entrance, an exit and a predetermined destination, and access to the restricted area is restricted for people, and wherein the movement module is configured to autonomously move the commercial vehicle from the entrance to the predetermined destination and to autonomously move it from the predetermined destination to the exit.

2. The system of claim 1, wherein the detection module has a sensor module; and wherein the identification module is configured to ascertain a relative position based on data from the sensor unit or the sensor module.

3. The system of claim 2, wherein the identification module is configured to take sensor data from the sensor unit or sensor module as a basis for detecting a reference point in surroundings of the commercial vehicle and to ascertain a position of the commercial vehicle relative to the reference point.

4. The system of claim 2, wherein the sensor module or the sensor unit has at least one of the following: a differential or global positioning system, a camera, a radar, a laser scanner, a wireless communication interface or a mobile radio module.

5. The system of claim 1, wherein the commercial vehicle has at least one dynamic vehicle sensor configured to ascertain a speed and/or change of direction of the commercial vehicle, and wherein the movement module is configured to take sensor data from the at least one dynamic vehicle sensor as a basis for determining at least one change of position relative to a previously detected position in order to allow a path of movement to be tracked.

6. The system of claim 1, wherein the information acquisition module is configured to store the cartographic data in the commercial vehicle.

7. The system of claim 1, wherein the commercial vehicle has a radio unit, and wherein the information acquisition module is configured to wirelessly contact the database via the radio unit to transmit the information wirelessly.

8. A commercial vehicle, comprising:
a system for controlling the commercial vehicle in a restricted area, including:
an information acquisition module to acquire information from a database about the restricted area, wherein the commercial vehicle includes a sensor unit to detect objects in surroundings of the commercial vehicle, and wherein the acquired information includes cartographic data for objects in the restricted area;
a detection module to detect at least one object in the surroundings of the vehicle using the sensor unit of the commercial vehicle;
an identification module to identify the at least one detected object in the cartographic data;
and a movement module to allow autonomous movement of the commercial vehicle in the restricted area based on the identified objects;
and at least one vehicle actuator, wherein the movement module is configured to move the commercial vehicle by actuating the at least one vehicle actuator
wherein the movement module is configured to ascertain a position of the commercial vehicle during the autonomous movement based on the cartographic data from the database and based on the at least one detected object, and wherein the restricted area has an entrance, an exit and a predetermined destination, and access to the restricted area is restricted for people, and wherein the movement module is configured to autonomously move the commercial vehicle from the entrance to the predetermined destination and to autonomously move it from the predetermined destination to the exit.

9. A method for controlling a commercial vehicle in a restricted area, the method comprising:
acquiring information about the restricted area from a database, wherein the commercial vehicle has a sensor unit configured to detect objects in surroundings of commercial vehicle, and wherein the acquired information includes cartographic data for objects in the restricted area;
detecting at least one object in the surroundings of the vehicle using the sensor unit of the commercial vehicle;
identifying the at least one detected object in the cartographic data;
and autonomously moving the commercial vehicle in the restricted area based on the identified objects
wherein the movement module is configured to ascertain a position of the commercial vehicle during the autonomous movement based on the cartographic data from the database and based on the at least one detected object, and wherein the restricted area has an entrance, an exit and a predetermined destination, and access to the restricted area is restricted for people, and wherein the movement module is configured to autonomously move the commercial vehicle from the entrance to the predetermined destination and to autonomously move it from the predetermined destination to the exit.

10. A non-transitory computer readable medium having a computer program, which is executable by a processor, comprising:
a program code arrangement having program code for controlling a commercial vehicle in a restricted area, by performing the following:
acquiring information about the restricted area from a database, wherein the commercial vehicle has a sensor unit configured to detect objects in surroundings of commercial vehicle, and wherein the acquired information includes cartographic data for objects in the restricted area;
detecting at least one object in the surroundings of the vehicle using the sensor unit of the commercial vehicle;
identifying the at least one detected object in the cartographic data; and
autonomously moving the commercial vehicle in the restricted area based on the identified objects
wherein the movement module is configured to ascertain a position of the commercial vehicle during the autonomous movement based on the cartographic data from the database and based on the at least one detected object, and wherein the restricted area has an entrance, an exit and a predetermined destination, and access to the restricted area is restricted for people, and wherein the movement module is configured to autonomously move the commercial vehicle from the entrance to the predetermined destination and to autonomously move it from the predetermined destination to the exit.

* * * * *